US008724655B2

(12) United States Patent
Sum et al.

(10) Patent No.: US 8,724,655 B2
(45) Date of Patent: May 13, 2014

(54) WIRELESS COMMUNICATION SYSTEM, AND INTERFERENCE PREVENTING METHOD

(75) Inventors: Chin-Sean Sum, Tokyo (JP); Hiroshi Harada, Tokyo (JP); Fumihide Kojima, Tokyo (JP); Zhou Lan, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 32 days.

(21) Appl. No.: 13/518,978

(22) PCT Filed: Dec. 15, 2010

(86) PCT No.: PCT/JP2010/007292
§ 371 (c)(1),
(2), (4) Date: Jun. 25, 2012

(87) PCT Pub. No.: WO2011/077671
PCT Pub. Date: Jun. 30, 2011

(65) Prior Publication Data
US 2012/0269130 A1    Oct. 25, 2012

(30) Foreign Application Priority Data

Dec. 25, 2009  (JP) .................................. 2009-293757

(51) Int. Cl.
*H04J 3/16* (2006.01)
(52) U.S. Cl.
USPC ........... 370/468; 370/329; 370/278; 370/338; 370/348
(58) Field of Classification Search
USPC ....................................................... 455/41.2
See application file for complete search history.

(56) References Cited

U.S. PATENT DOCUMENTS

| 7,447,503 | B2 * | 11/2008 | Shvodian | 455/435.2 |
| 7,664,030 | B2 * | 2/2010 | Sugaya | 370/235 |
| 7,826,475 | B2 * | 11/2010 | Lee et al. | 370/445 |
| 8,165,050 | B2 * | 4/2012 | Ngo et al. | 370/311 |
| 8,279,814 | B2 * | 10/2012 | Kwon et al. | 370/329 |
| 8,432,878 | B2 * | 4/2013 | Wang et al. | 370/338 |
| 8,477,671 | B2 * | 7/2013 | Lampe et al. | 370/311 |
| 2003/0169697 | A1 * | 9/2003 | Suzuki et al. | 370/310 |
| 2004/0022219 | A1 * | 2/2004 | Mangold et al. | 370/336 |
| 2004/0053621 | A1 | 3/2004 | Sugaya | |

(Continued)

FOREIGN PATENT DOCUMENTS

| EP | 1 648 121 | 4/2006 |
| JP | 2004-040645 | 2/2004 |

(Continued)

*Primary Examiner* — Ricky Ngo
*Assistant Examiner* — Dewanda Samuel
(74) *Attorney, Agent, or Firm* — Jacobson Holman PLLC (57) ABSTRACT

An interference preventing method prevents communication interference between two or more wireless communication networks having mutually different physical layers, in which wireless communication is performed between a plurality of devices and a coordinator. By using a coordinator of each of the wireless communication networks, a scanning period for scanning a coexistence notification signal that is transmitted from a coordinator of another wireless communication network for a predetermined period is arranged before a first super frame immediately after input of power. The CB of the coordinator is transmitted at least once or more for one super frame, and, in a case where the CB transmitted from the coordinator of the other wireless communication network is acquired during the scanning period, control for preventing communication interference with the other wireless communication network is performed.

4 Claims, 9 Drawing Sheets

(56) References Cited

U.S. PATENT DOCUMENTS

| | | |
|---|---|---|
| 2005/0063372 A1 | 3/2005 | Jeong et al. |
| 2005/0068928 A1* | 3/2005 | Smith et al. .......... 370/338 |
| 2006/0007907 A1 | 1/2006 | Shao et al. |
| 2006/0030362 A1* | 2/2006 | Fukuda .............. 455/561 |
| 2008/0018521 A1 | 1/2008 | Sahinoglu et al. |

FOREIGN PATENT DOCUMENTS

| | | |
|---|---|---|
| JP | 2004-242204 | 8/2004 |
| JP | 2005-020162 | 1/2005 |
| JP | 2005-102218 | 4/2005 |
| JP | 2006-033827 | 2/2006 |
| JP | 2006-115512 | 4/2006 |
| JP | 2006-197177 | 7/2006 |
| JP | 2008-026310 | 2/2008 |
| WO | WO 2005/010214 | 2/2005 |
| WO | WO 2005/029744 | 3/2005 |
| WO | WO 2005/055493 | 6/2005 |
| WO | WO 2008/097384 | 8/2008 |

* cited by examiner

WIRELESS COMMUNICATION SYSTEM, AND INTERFERENCE PREVENTING METHOD

This is a national stage of PCT/JP10/007292 filed Dec. 15, 2010 and published in Japanese, which claims the priority of Japanese number 2009-293757 filed Dec. 25, 2009, hereby incorporated by reference.

TECHNICAL FIELD

The present invention relates to providing a wireless communication system and an interference preventing method, which are suitable for preventing communication interference between two or more wireless communication networks having mutually different physical layers, of a wireless communication network that performs wireless communication among a plurality of devices and a coordinator.

BACKGROUND ART

A wireless local area network (LAN) has advantages including that a space for cables is reduced, and a mobile terminal including a notebook personal computer (notebook PC) can be connected to a LAN without losing the mobility, over a wired LAN. In addition, since a high speed and low cost are implemented in the wireless LAN, the practical use of the wireless LAN is further accelerated. Based on such situations, the standardization of the wireless LAN has been worked by Institute of Electrical and Electronics Engineering (IEEE).

Particularly, in a radio pocket communication system that is represented by a wireless LAN, there is a problem of a contention for wireless resources between a plurality of terminals. In order to avoid the contention for wireless resources, a medium access control (MAC) is necessary. As an MAC protocol for the wireless LAN, a carrier sense multiple access (CSMA) system has been proposed in which a terminal detects a carrier of the other terminals before transmission of a packet, which is called carrier sense, and transmits a packet in a case where the carrier is not detected. In addition, a carrier sense multiple access with collision avoidance (CSMA/CA) system has been also proposed in which a packet collision avoiding structure is added to the CSMA system.

The CSMA/CA system is a system in which communication is initiated, the communication is assumed to be successful in a case where a reply of an acknowledge (ACK) signal is received and the occurrence of communication collision with another wireless node is assumed, and packet data is retransmitted by arranging a back off time in a case where an ACK signal is not received.

Particularly in recent years, there are many CSMA/CA systems that are in compliance with the IEEE 802.15.4 standard. The IEEE 802.15.4 standard is for wireless communication using a frequency near 868 MHz, 915 MHz, and 2.45 GHz and is particularly used for a home appliance-dedicated local area network such as Zigbee (registered trademark). In Zigbee (registered trademark), a PHY layer and an MAC layer defined in the IEEE 802.15.4 standard are used, and a network layer and an application layer, which are uppers layers thereof, are standardized. Zigbee (registered trademark) enables realization of ultra-low power consumption, miniaturization, and low cost by utilizing the features of the IEEE 802.15.4 standard.

As above, the IEEE 802.15.4 standard has attracted attention as a key technology for realizing not only a sensor network but also a home network, an office network, and a communication network for communicating with various medial apparatuses installed to a human body and for realizing a ubiquitous network society in the future.

Figure 8:
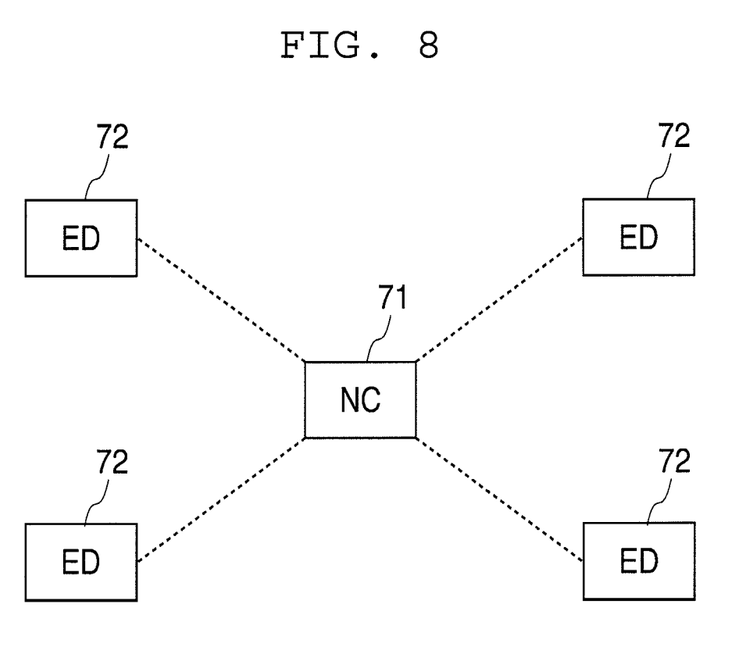
FIG. 8 is a diagram that illustrates a conventional wireless communication system that is configured by an NC and a plurality of EDs.

Generally, according to wireless communication that is compliant with the IEEE 802.15.4 standard, as illustrated in FIG. 8, wireless communication is performed between a network coordinator (NC) 71 that controls a network 7 and a plurality of end devices (ED) 72. In addition, as an example of the network 7, a variety of network forms such as a star type, a tree type, and a mesh type can be selected.

In addition, in the wireless communication that is compliant with the IEEE 802.15.4 standard, a so-called super frame structure using a beacon is used. In the super frame structure, a beacon interval is divided into a contention access period (CAP) during which all the EDs 72 can perform access, a contention free period (CFP) during which a specific ED 72 can exclusively perform access, and an inactive period during which access of all the EDs 72 is prohibited. In addition, the CFP is equally divided into seven parts through a guaranty time slot (GTS) mechanism and can be allocated to EDs 72 for which communication is desired to be performed with high priority.

As conventional radio pocket communication systems that are compliant with the IEEE 802.15.4 standard, for example, systems disclosed in Patent Literatures 1 and 2 and the like have been proposed. In addition, as a technique for suppressing the collision of packets in the CSMA/CA system, for example, techniques disclosed in Patent Literatures 3 and 4 have been proposed.

CITATION LIST

Patent Literature

Patent Literature 1: Japanese Patent Application Laid-Open No. 2005-102218
Patent Literature 2: Japanese Patent Application Laid-Open No. 2008-026310
Patent Literature 3: Japanese Patent Application Laid-Open No. 2004-242204
Patent Literature 4: Japanese Patent Application Laid-Open No. 2006-197177

SUMMARY OF INVENTION

Technical Problem

Figure 9:
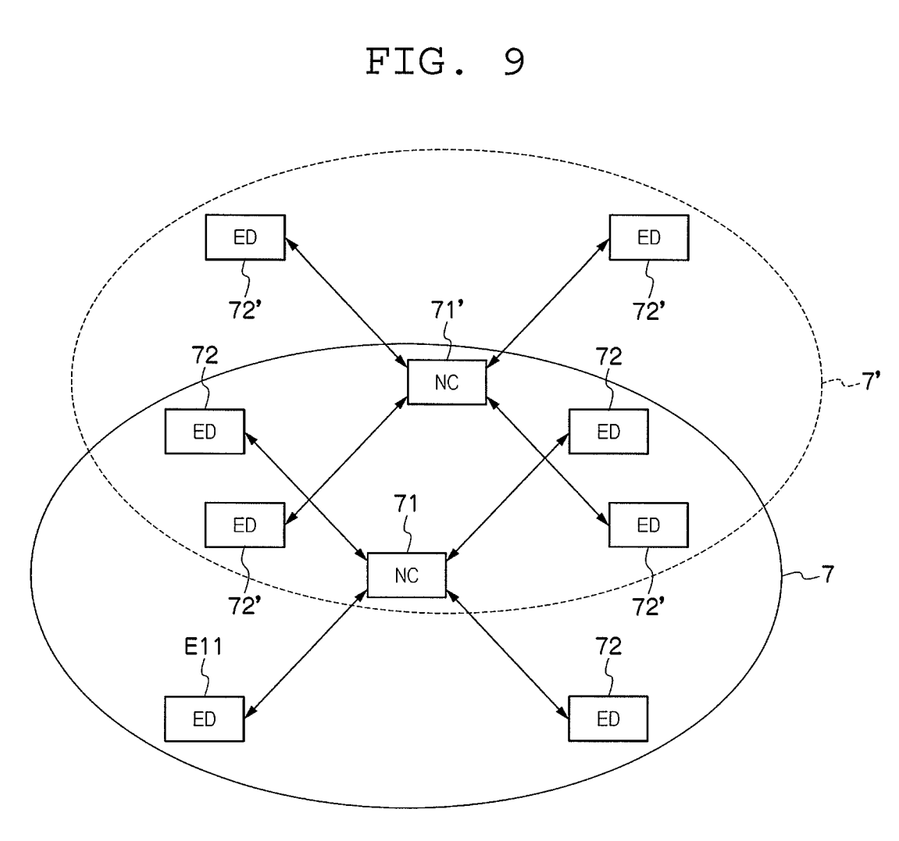
FIG. 9 is diagram that illustrates problems in the related art.

However, for example, as illustrated in FIG. 9, there is a case where two or more networks 7 and 7' coexist. While the network 7 is configured by an NC 71 and a plurality of EDs 72, and the network 7' is configured by an NC 71' and EDs 72', the networks perform wireless communication through different physical layers.

However, in a case where two or more networks 7 and 7' coexist as above, there is a case where mutual communication interference occurs. In other words, there is a case where communication between the NC 71 of the network 7 and the ED 72 of the network 7 is interfered by communication that is performed between the NC 71' of the network 7' and the ED 72' of the network 7'. The reason for this is that there is no exchange between the NCs 71 and 71' that are responsible for the roles as central control units of the networks 7 and 7', and wireless communication is performed through independent physical layers while the existence of the other is ignored.

Thus, in a wireless communication system in which two or more networks 7 and 7' having mutually different physical layers coexist, the necessity for devising an interference preventing method capable of preventing communication interference has increased especially in recent years.

The present invention is contrived in view of the above-described problems, and an object thereof is to provide a wireless communication system and an interference preventing method capable of preventing communication interference between wireless communication networks in the wireless communication system in which two or more wireless communication networks having mutually different physical layers coexist, and each one of the wireless communication networks performs wireless communication between a plurality of devices and a coordinator.

Solution to Problem

In order to solve the above-described problems, according to the present invention, there is provided a wireless communication system in which two or more wireless communication networks having mutually different physical layers coexist, and, in each one of the wireless communication networks, wireless communication is performed between one or more devices and a coordinator, wherein a coordinator of each one of the wireless communication networks, before a first super frame immediately after input of power, arranges a scanning period for scanning a coexistence notification signal that is transmitted from a coordinator of another wireless communication network for a predetermined period, transmits the coexistence notification signal of the coordinator once for one or a plurality of super frames, and, in a case where the coexistence notification signal transmitted from the coordinator of the another wireless communication network is acquired during the scanning period, performs control for preventing communication interference with the another wireless communication network.

In order to solve the above-described problems, according to the present invention, there is provided a wireless communication system in which two or more wireless communication networks having mutually different physical layers coexist, and, in each one of the wireless communication networks, wireless communication is performed between a plurality of devices and a coordinator, wherein a coordinator of each one of the wireless communication networks, immediately after input of power, arranges a scanning period for scanning a coexistence notification signal that is transmitted from a coordinator of another wireless communication network for a predetermined period, sequentially transmits the coexistence notification signal of the coordinator at least at intervals, and, in a case where the coexistence notification signal transmitted from the coordinator of the another wireless communication network is acquired during the scanning period, performs control for preventing communication interference with the another wireless communication network.

In order to solve the above-described problems, according to the present invention, there is provided an interference preventing method, which prevents communication interference between two or more wireless communication networks having mutually different physical layers, of a wireless communication network in which wireless communication is performed between one or more devices and a coordinator, wherein, by using a coordinator of each one of the wireless communication networks, a scanning period for scanning a coexistence notification signal that is transmitted from a coordinator of another wireless communication network for a predetermined period is arranged before a first super frame immediately after input of power, the coexistence notification signal of the coordinator is transmitted once for one or a plurality of super frames, and, in a case where the coexistence notification signal transmitted from the coordinator of the another wireless communication network is acquired during the scanning period, control for preventing communication interference with the another wireless communication network is performed.

In order to solve the above-described problems, according to the present invention, there is provided an interference preventing method, which prevents communication interference between two or more wireless communication networks having mutually different physical layers, of a wireless communication network in which wireless communication is performed between a plurality of devices and a coordinator.

In the interference preventing method, by using a coordinator of each one of the wireless communication networks, a scanning period for scanning a coexistence notification signal that is transmitted from a coordinator of another wireless communication network for a predetermined period is arranged immediately after input of power, the coexistence notification signal of the coordinator is sequentially transmitted at least at intervals, and, in a case where the coexistence notification signal transmitted from the coordinator of the another wireless communication network is acquired during the scanning period, control for preventing communication interference with the another wireless communication network is performed.

Advantageous Effects of Invention

According to the present invention that is formed by the above-described configuration, a coordinator that scans a coexistence notification signal can identify another coordinator located in the vicinity thereof and further identify the existence of the wireless communication network. Then, the coordinator that has acquired the coexistence notification signal can perform control for preventing communication interference between the wireless communication networks.

These and other objects of the invention, as well as many of the intended advantages thereof, will become more readily apparent when reference is made to the following description taken in conjunction with the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF EMBODIMENTS

Hereinafter, an embodiment of the present invention will be described in detail with reference to the drawings.

Figure 1:
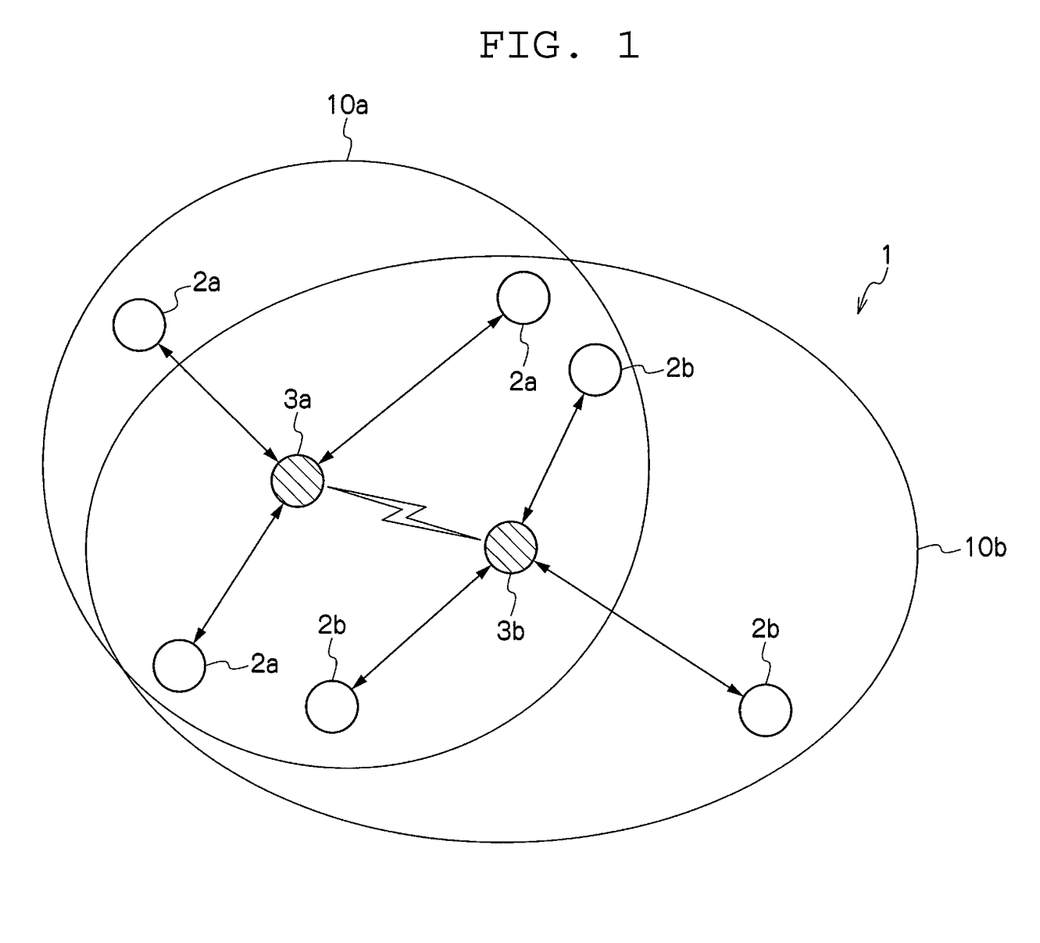
FIG. 1 is a diagram that illustrates a configuration example of a wireless communication system according to the present invention.

FIG. 1 is a diagram that illustrates a configuration example of a wireless communication system 1 according to the present invention. The wireless communication system 1 is configured by two wireless communication networks 10a and 10b. The wireless communication network 10a includes a plurality of devices 2a and a coordinator 3a that controls the overall operation of the network. In addition, the wireless communication network 10b includes a plurality of devices 2b and a coordinator 3b that controls the overall operation of the network.

Although a case is illustrated as an example in which the above-described wireless communication system 1 illustrated in FIG. 1 is configured by two wireless communication networks 10a and 10b, the wireless communication system is not limited thereto and may be configured by three or more wireless communication networks 10.

The wireless communication networks 10, for example, are personal area networks (PAN) that are compliant with the IEEE 802.15.4 g standard. Here, the wireless communication network 10 is not limited to the star type as illustrated in FIG. 1, but any network form such as the tree type or the mesh type may be applied thereto.

The device 2, for example, is configured by any type of mobile information terminal such as a notebook-type personal computer (notebook PC) or a cellular phone or the like. The device 2 can perform radio pocket communication with the coordinator 3 at least in the WPAN and performs radio pocket communication with another device 2 through the coordinator 3.

Similarly, the coordinator 3 may have the same configuration as that of the above-described mobile information terminal. The coordinator 3 takes a role as a central control unit. The coordinator 3 acquires a beacon that is transmitted from the device 2 and, in order to connect the device 2 to the WPAN, takes a role for synchronizing them.

Each of the two wireless communication networks 10a and 10b performs wireless communication between the coordinator 3 and the device 2 through an independent physical layer. This means that the two wireless communication networks 10a and 10b perform wireless communication between the coordinators 3 and the devices 2 through mutually different physical layers.

Figure 2:
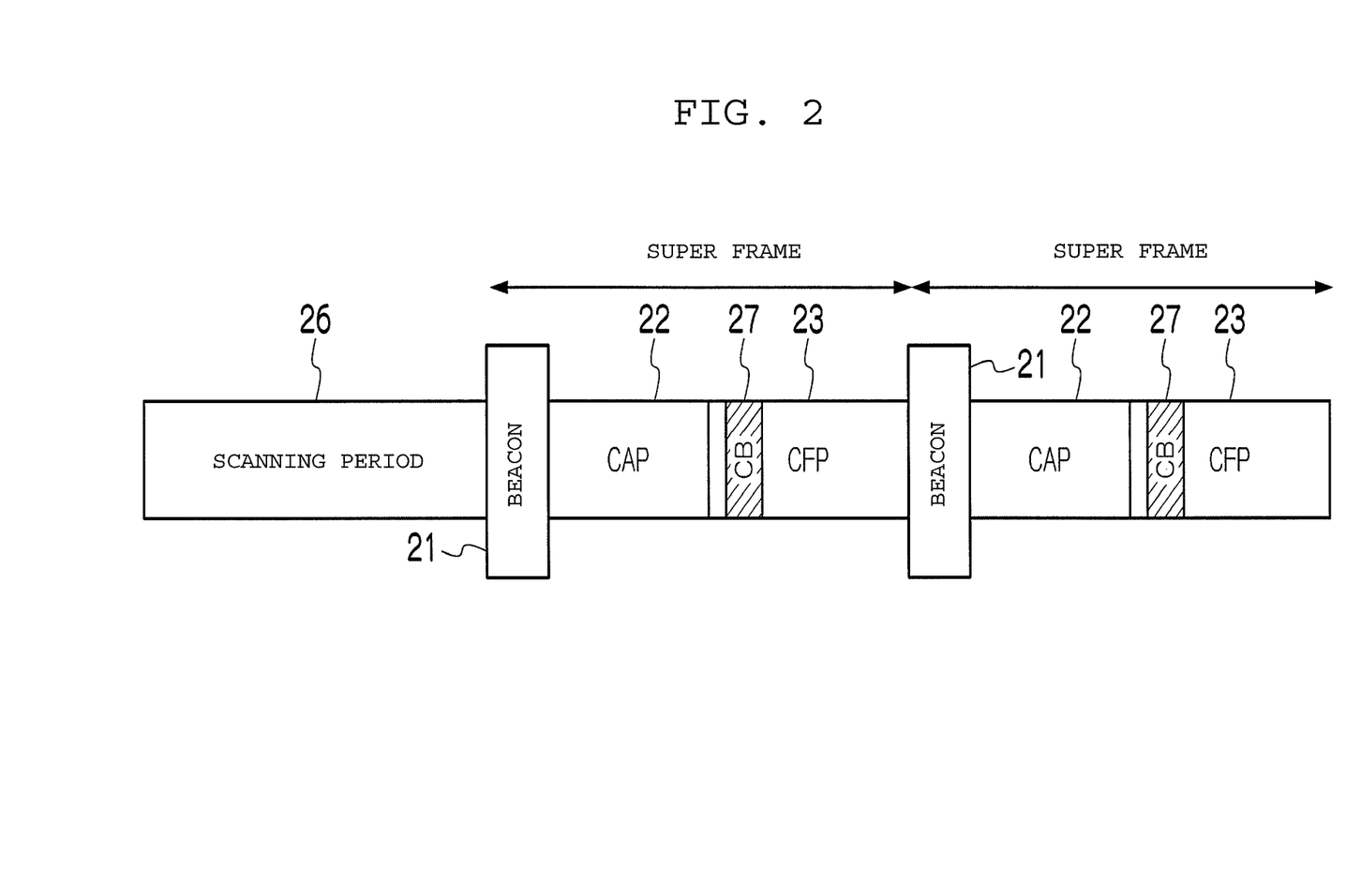
FIG. 2 is a diagram that illustrates a super frame structure used in the wireless communication system according to the present invention.

The wireless communication system 1 according to the present invention, for example, as illustrated in FIG. 2, uses a so-called super frame structure using a beacon 21. The super frame has a contention access period (CAP) 22 and a contention free period (CFP) 23 after a beacon 21. A time between two beacons 21 is divided into slots of a predetermined number regardless of the period of the super frame. In addition, in the super frame structure, the number of slots that configure the CFP 23 is variable, and the number of slots that configure the CAP 22 is fixed. The CAP 22 is a period during which all the devices 2 can make access, and the CFP 23 is a period during which a specific device 2 can exclusively make access.

Furthermore, in the wireless communication system according to the present invention, the coordinator 3 sequentially transmits coexistence notification signals (CB) 27 that are used for notifying the existence thereof. The CB 27 may be configured by a so-called beacon or an ordinary signal that is formed by a plurality of frames. The CB 27, for example, as a physical layer, may be based on each specification of the physical layer such as a frequency shift keying (FSK) as a frequency shifting-type modulation type for modulating a sinusoidal wave into a digital signal, an orthogonal frequency division multiplexing (OFDM) as an orthogonal frequency division multiplexing type, or a direct sequence spread spectrum (DSSS) as a direct spread type. The FSK, OFDM, and DSSS are examples, and any other specification of a physical layer may be used.

Table 1 illustrates an example of parameters of the CB 27 in the physical layer.

TABLE 1

| Parameter | Value |
|---|---|
| Data Rate | 50 kb/s |
| Symbol Rate | 50 symbols/s |
| Type | GFSK |
| Bandwidth Time | 0.5 |
| Encoding Rate | 1 |

While the CB 27 is transmitted at predetermined intervals or at random intervals, it is necessary to transmit once for one or more super frames. In addition, it is preferable that the CB 27 is transmitted at least once for one super frame. The CB 27 may belong to either the CAP 22 or the CFP 23. In addition, a scanning period 26 is arranged before a first super frame immediately after the input of power. The scanning period 26 is a period that is used for scanning a CB 27 transmitted from the coordinator 3 of another wireless communication network 10 and taking in the CB. The scanning period 26 may be a period of at least a length that is equal to or longer than a period between two CBs 27 adjacent to each other or equal to or longer than the length of the super frame.

Next, an interference preventing method will be described in detail, in which communication interference between two or more wireless communication networks 2a and 2b having mutually different physical layers is prevented by using the wireless communication system 1 according to the present invention.

Figure 3:
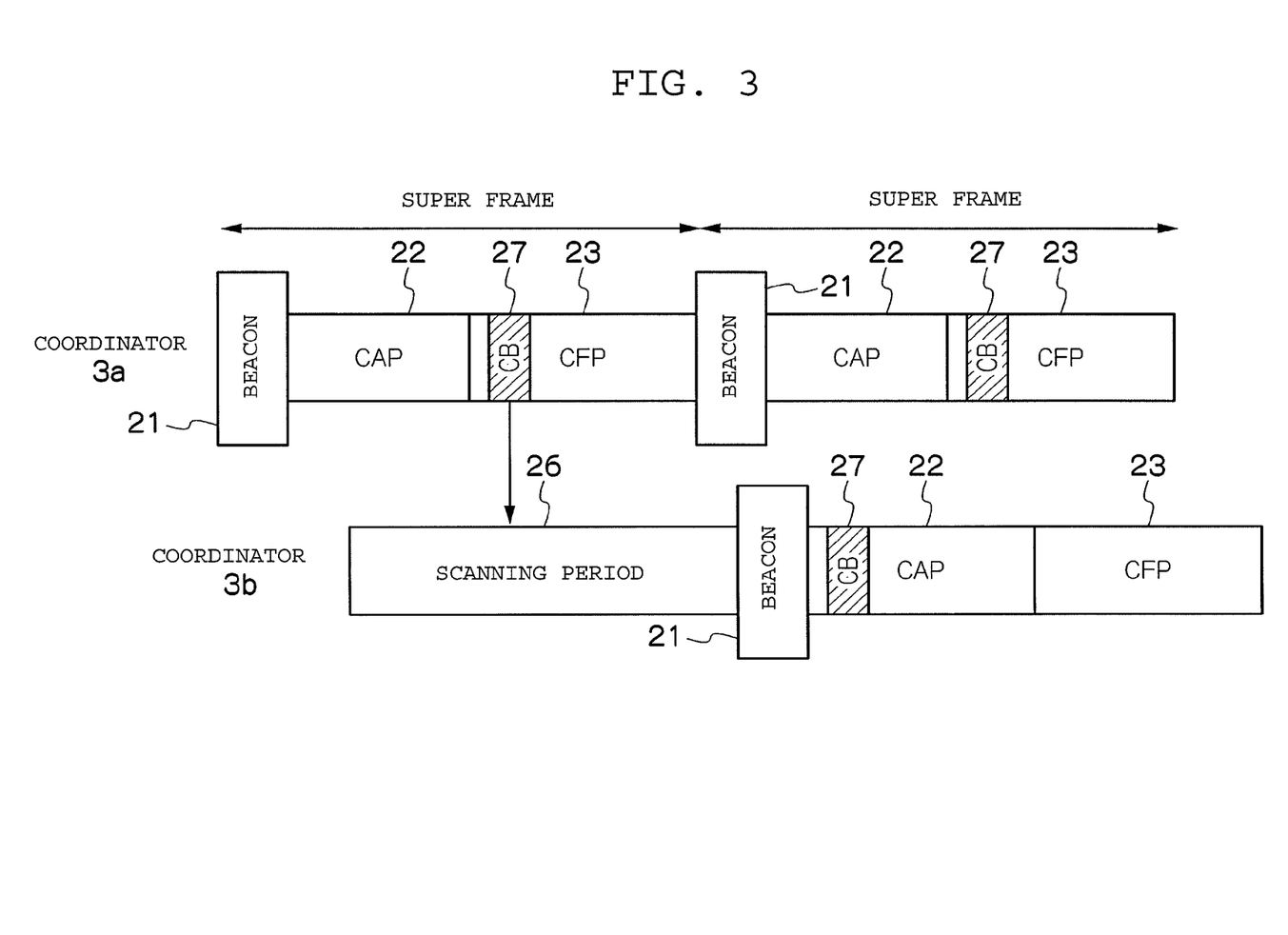
FIG. 3 is a diagram that illustrates an interference preventing method according to the present invention.

First, as illustrated in FIG. 3, it is assumed that a coordinator 3a of a wireless communication network 10a is operated and performs wireless communication with a device 2a under the above-described super frame structure. In addition, the coordinator 3a transmits a CB 27 once or more for one or a plurality of super frames during that interval. Thereafter, it is assumed that the power of a coordinator 3b of another wireless communication network 10b that has a physical layer different from that of the wireless communication network 10a is input. As a result, in the coordinator 3b, a scanning period 26 is started before a first super frame immediately after the input of power.

The scanning period 26 of the coordinator 3b, for example, as illustrated in FIG. 3, has a length that is equal to or longer than the length of the super frame. Accordingly, by transmitting the CB 27 from the coordinator 3a at the rate of once for one super frame, the coordinator 3b can scan and acquire the CB 27.

The coordinator 3b that has scanned the CB 27 can identify another coordinator 3a that is present in the vicinity thereof and can further identify the presence of the wireless communication network 10a. In a case where the CB 27 is acquired, the coordinator 3b performs control for preventing communication interference with the another wireless communication network 10b. The coordinator 3b may perform synchronization, interrupt of the communication, or start of communication through a different channel as the control for preventing communication interference.

Figure 4:
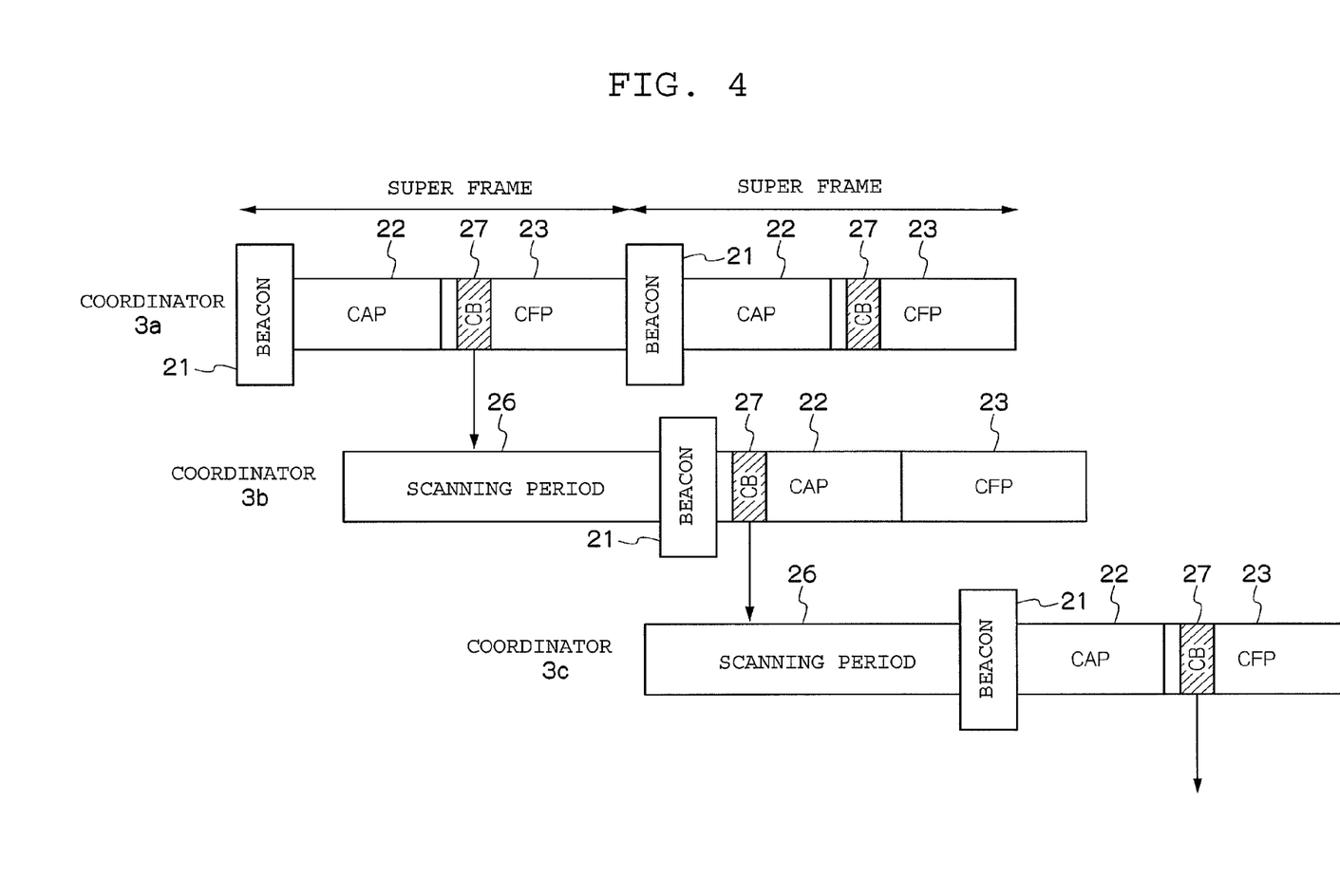
FIG. 4 is another diagram that illustrates an interference preventing method according to the present invention.

In addition, similarly, the coordinator 3b, for example, as illustrated in FIG. 4, transmits the CB 27 once or more for one super frame. As a result, in a case where the power of further another coordinator 3c is newly turned on in an interference area, the CB 27 is acquired during the scanning period 26 of the further another coordinator 3c. Then, the further another coordinator 3c performs any type of control for preventing communication interference with the another coordinator 3b based on the acquired CB 27.

Figure 5:
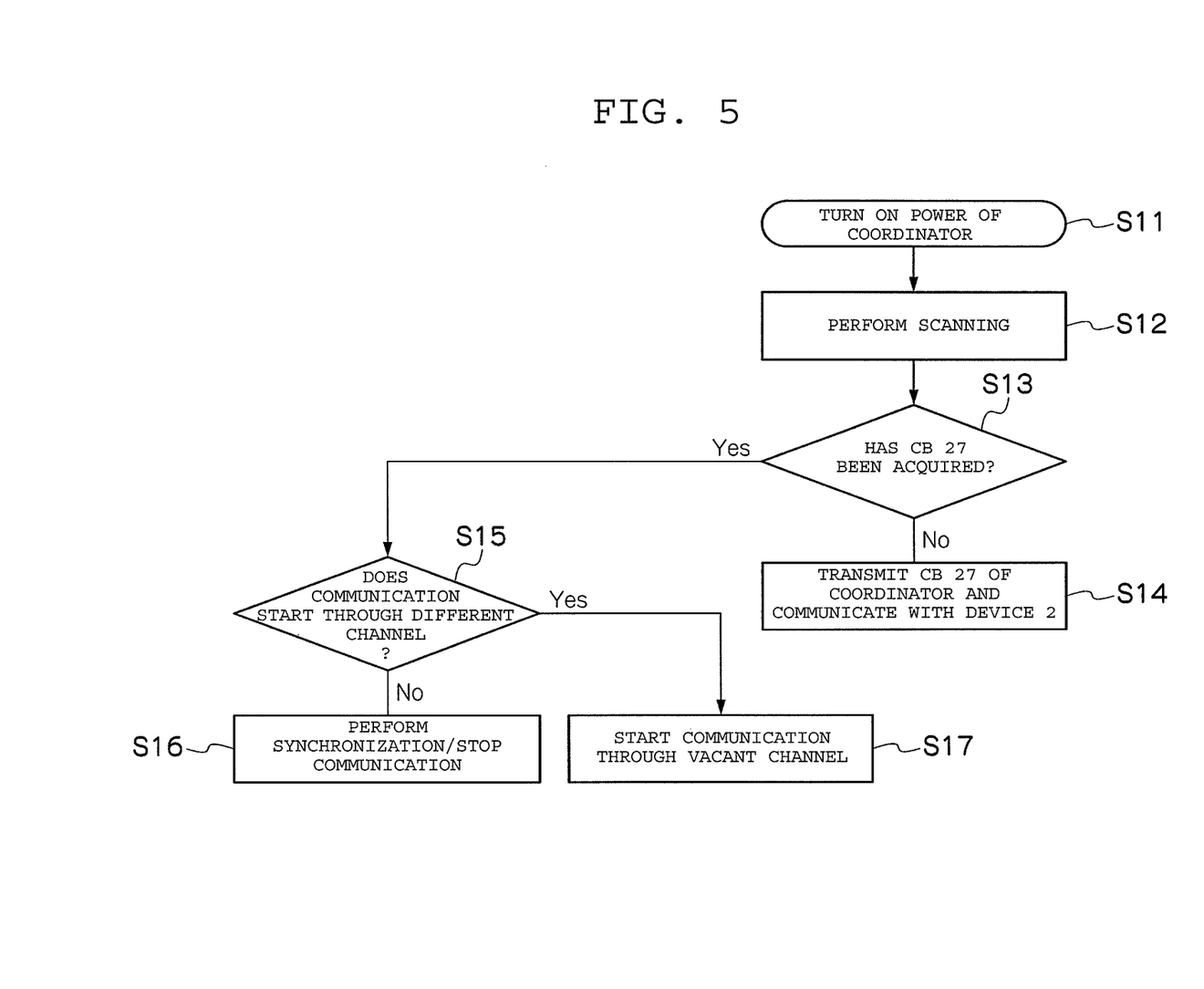
FIG. 5 is a flowchart that illustrates a process for actual interference prevention.

Each coordinator 3 is operated based on a flowchart illustrated in FIG. 5 as below.

First, after the power of the coordinator 3 is turned on in Step S11, the coordinator performs scanning during the scanning period 26 in Step S12. As a result, the process proceeds to Step S15 in a case where a CB has been acquired from another coordinator 3 in Step S13, and the process proceeds to Step S14 in a case where any CB has not been acquired in Step S13.

In a case where the process proceeds to Step S14, it represents that another coordinator 3 is not present in the vicinity thereof. In such a case, the coordinator 3 transmits the CB 27 thereof at predetermined intervals or at random intervals. It may be configured such that, after an area is allocated in the super frame simultaneously with the transmission, communication with the device 2 is performed.

In a case where the process proceeds to Step S15, it represents that another coordinator 3 is present in the vicinity. In such a case, it is determined whether or not communication is to be started through a different channel. In a case where communication through a different channel has been determined not to be started, the process proceeds to Step S16, and the communication with the device 2 is started while synchronization with another coordinator is performed, or the communication is stopped. In contrast to this, in a case where communication through a different channel has been determined not to be started, the process proceeds to Step S17, and communication with another device 2 is started through a vacant channel.

In this way, even in a case where two or more wireless communication networks 10 having mutually different physical layers coexist, by performing negotiation between the coordinators 3, the occurrence of mutual communication interference can be prevented.

Figure 6:
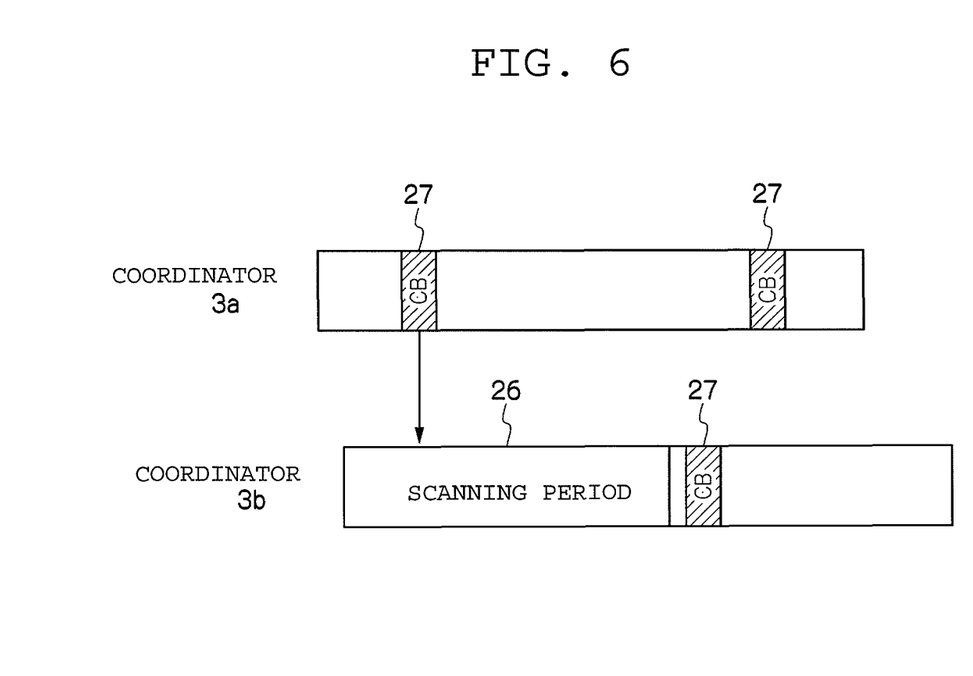
FIG. 6 is a diagram that illustrates an interference preventing method in a system that does not employ a super frame structure.

In addition, the present invention is not limited to the above-described embodiment, but, as illustrated in FIG. 6, can similarly prevent communication interference in a beaconless network in which a beacon is not transmitted or a coordinator 3 that does not configure a so-called super frame structure.

First, as illustrated in FIG. 6, it is assumed that a coordinator 3a of a wireless communication network 10a is operated and performs wireless communication with a device 2a. In addition, it is assumed that the coordinator 3a sequentially transmits CBs 27 at intervals during that interval. Thereafter, it is assumed that the power of a coordinator 3b of a wireless communication network 10b having a physical layer that is different from that of the wireless communication network 10a is turned on. As a result, in the coordinator 3b, a scanning period 26 that is immediately after the input of power is started.

The scanning period 26 of the coordinator 3b has a length that is equal to or longer than the transmission interval of the CB. Accordingly, by transmitting the CB 27 from the coordinator 3a at a specific constant transmission interval, the coordinator 3b can scan and acquire the CB 27.

The coordinator 3b that has scanned the CB 27 can identify another coordinator 3a that is present in the vicinity thereof and can further identify the presence of the wireless communication network 10a. In a case where the CB 27 is acquired, the coordinator 3b can perform control for preventing communication interference with the another wireless communication network 10b.

Figure 7:
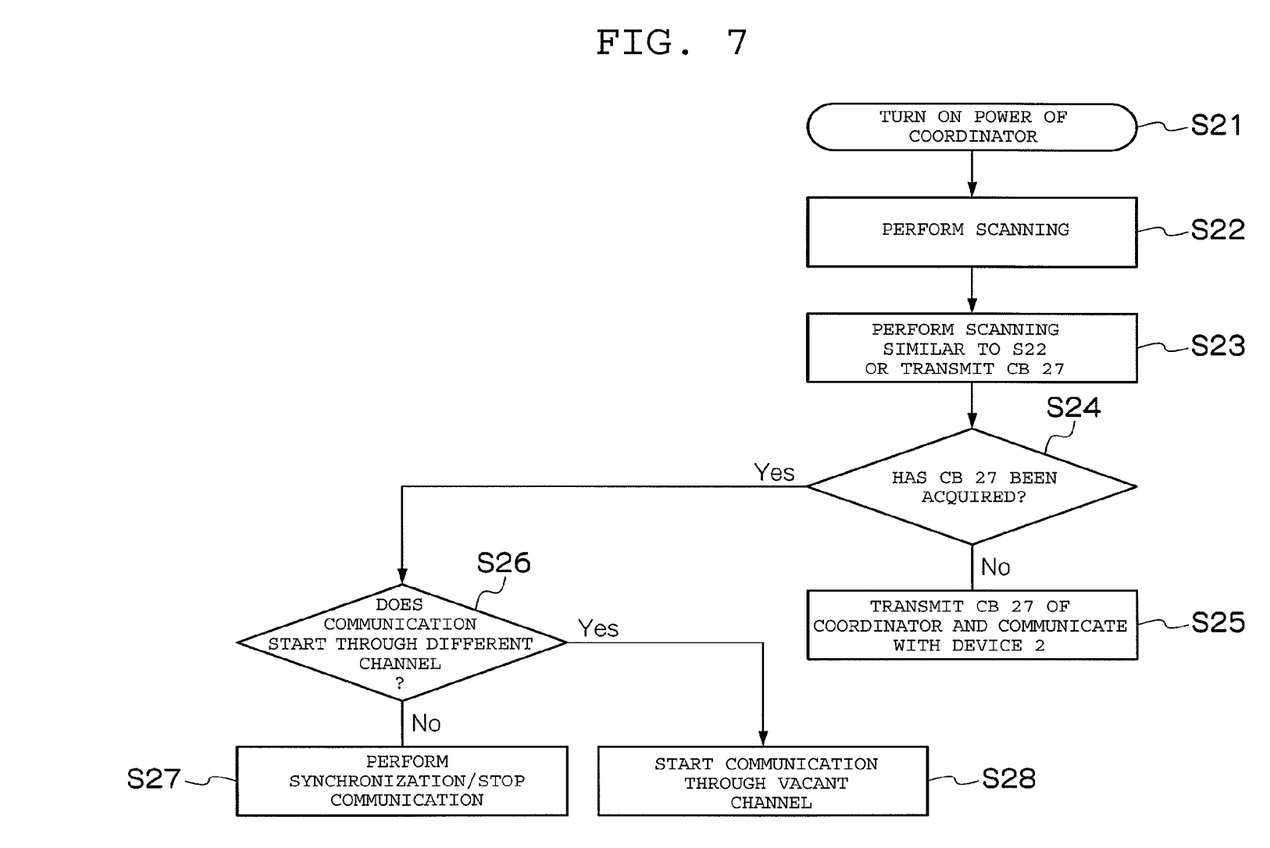
FIG. 7 is another flowchart that illustrates a process for actual interference prevention.

Each coordinator 3 in such a beaconless network is operated based on a flowchart that is illustrated in FIG. 7 as below.

First, after the power of the coordinator 3 is turned on in Step S21, the coordinator performs scanning during the scanning period 26 in Step S22. As a result, the process proceeds to Step S25 in a case where a CB has been acquired from another coordinator 3 in Step S23, and the process proceeds to Step S24 in a case where any CB has not been acquired in Step S23.

In a case where the process proceeds to Step S24, it represents that another coordinator 3 is not present in the vicinity thereof. In such a case, the coordinator 3 transmits the CB 27 thereof at predetermined intervals or at random intervals. It may be configured such that, simultaneously with the transmission, communication with the device 2 is performed.

In a case where the process proceeds to Step S25, it represents that another coordinator 3 is present in the vicinity. In such a case, it is determined whether or not communication is to be started through a different channel. In a case where communication through a different channel has been determined not to be started, the process proceeds to Step S26, and the communication with the device 2 is started while synchronization with another coordinator is performed, or the communication is stopped. In contrast to this, in a case where communication through a different channel has been determined not to be started, the process proceeds to Step S27, and communication with another device 2 is started through a vacant channel.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

REFERENCE SIGNS LIST

1 Wireless communication system
2 Device
3 Coordinator
10 Wireless communication network
21 Beacon
22 CAP
23 CFP
26 Scanning period
27 CB

The invention claimed is:

1. A wireless communication system in which two or more wireless communication networks having mutually different physical layers coexist, and, in each one of the wireless communication networks, wireless communication is performed between one or more devices and a coordinator,
wherein a coordinator of each one of the wireless communication networks, before a first super frame immediately after input of power, arranges a scanning period that has a length equal to or longer than a length of the super frame for scanning a coexistence notification signal that is transmitted from a coordinator of another wireless communication network for a predetermined period, transmits the coexistence notification signal of the coordinator once for one or a plurality of super frames, and in a case where the coexistence notification signal transmitted from the coordinator of the another wireless communication network is acquired during the scanning period, performs control for preventing communication interference with the another wireless communication network.

2. A wireless communication system in which two or more wireless communication networks having mutually different physical layers coexist, and, in each one of the wireless communication networks, wireless communication is performed between one or more devices and a coordinator, wherein a coordinator of each one of the wireless communication networks, before a first super frame immediately after input of power, arranges a scanning period for scanning a coexistence notification signal that is transmitted from a coordinator of another wireless communication network for a predetermined period, transmits the coexistence notification signal of the coordinator once for one or a plurality of super frames, and, in a case where the coexistence notification signal transmitted from the coordinator of the another wireless communication network is acquired during the scanning period, performs control for preventing communication interference with the another wireless communication network, wherein the coexistence notification signal is transmitted based on a specification of the physical layer of frequency shifting keying (FSK), orthogonal frequency division multiplexing (OFDM), and direct sequence spread spectrum (DSSS).

3. An interference preventing method, which prevents communication interference between two or more wireless communication networks having mutually different physical layers, of a wireless communication network in which wireless communication is performed between one or more devices and a coordinator, wherein, by using a coordinator of each one of the wireless communication networks, a scanning period for scanning a coexistence notification signal that is transmitted from a coordinator of another wireless communication network for a predetermined period is arranged before a first super frame immediately after input of power, the scanning period having a length equal to or longer than a length of the super frame, and the coexistence notification signal of the coordinator is transmitted once for one or a plurality of super frames, and, in a case where the coexistence notification signal transmitted from the coordinator of the another wireless communication network is acquired during the scanning period, control for preventing communication interference with the another wireless communication network is performed.

4. An interference preventing method, which prevents communication interference between two or more wireless communication networks having mutually different physical layers, of a wireless communication network in which wireless communication is performed between one or more devices and a coordinator, wherein, by using a coordinator of each one of the wireless communication networks, a scanning period for scanning a coexistence notification signal that is transmitted from a coordinator of another wireless communication network for a predetermined period is arranged before a first super frame immediately after input of power, the coexistence notification signal of the coordinator is transmitted once for one or a plurality of super frames, and, in a case where the coexistence notification signal transmitted from the coordinator of the another wireless communication network is acquired during the scanning period, control for preventing communication interference with the another wireless communication network is performed, wherein the coexistence notification signal is transmitted based on a specification of the physical layer of frequency shifting keying (FSK), orthogonal frequency division multiplexing (OFDM), and direct sequence spread spectrum (DSSS).

* * * * *